USO11638032B2

(12) United States Patent
Chan et al.

(10) Patent No.: US 11,638,032 B2
(45) Date of Patent: Apr. 25, 2023

(54) VISTGAN: UNSUPERVISED VIDEO SUPER-RESOLUTION WITH TEMPORAL CONSISTENCY USING GAN

(71) Applicant: The Hong Kong University of Science and Technology, Hong Kong (CN)

(72) Inventors: Shueng Han Gary Chan, Hong Kong (CN); Song Wen, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 39 days.

(21) Appl. No.: 17/184,518

(22) Filed: Feb. 24, 2021

(65) Prior Publication Data

US 2021/0281878 A1    Sep. 9, 2021

Related U.S. Application Data

(60) Provisional application No. 63/100,272, filed on Mar. 5, 2020.

(51) Int. Cl.
| H04N 19/69 | (2014.01) |
| H04N 19/00 | (2014.01) |
| G06N 20/00 | (2019.01) |
| H04N 19/59 | (2014.01) |

(52) U.S. Cl.
CPC ............ H04N 19/59 (2014.11); G06N 20/00 (2019.01)

(58) Field of Classification Search
None
See application file for complete search history.

(56) References Cited

U.S. PATENT DOCUMENTS

2018/0075581 A1\*   3/2018   Shi ..................... G06N 3/084
2019/0206026 A1\*   7/2019   Vemulapalli ........... G06T 7/248

\* cited by examiner

*Primary Examiner* — Samuel D Fereja
(74) *Attorney, Agent, or Firm* — Idea Intellectual Limited; Margaret A. Burke; Sam T. Yip

(57) ABSTRACT

A VSR approach with temporal consistency using generative adversarial networks (VistGAN) that requires only the training HR video sequence to generate the HR/LR video frame pairs, instead of the pre-artificial-synthesized HR/LR video frame pairs, for training. By this unsupervised learning method, the encoder degrades the input HR video frames of a training HR video sequence to their LR counterparts, and the decoder seeks to recover the original HR video frames from the LR video frames. To improve the temporal consistency the unsupervised learning method provides a sliding window that explores the temporal correlation in both HR and LR domains. It keeps the temporal consistent and also fully utilizes high-frequency details from the last-generated reconstructed HR video frame.

10 Claims, 2 Drawing Sheets

VISTGAN: UNSUPERVISED VIDEO SUPER-RESOLUTION WITH TEMPORAL CONSISTENCY USING GAN

CROSS-REFERENCE WITH RELATED APPLICATIONS

The present application claims priority to the U.S. Provisional Utility Patent Application No. 63/100,272 filed Mar. 5, 2020; the disclosure of which is incorporated herein by reference in its entirety.

FIELD OF THE INVENTION

The present invention is generally related to techniques of generating high-resolution (HR) video from its low-resolution (LR) counterpart known as video super-resolution (VSR). More particularly, the present invention is related to VSR using machine learning models.

BACKGROUND

VSR is a reconstruction of a HR video sequence from its LR counterpart, and it has drawn much recent attention due to the development of high-definition (HD) displays and its widespread applications in video surveillance, storage and streaming. VSR aims to estimate the HR video sequence $\hat{v}^H = \{\hat{I}_0^H, \hat{I}_1^H, \ldots, \hat{I}_t^H\}$ from the input LR video sequence $v^L = \{I_0^L, I_1^L, \ldots, I_t^L\}$, which should approach the actual counterpart HR video sequence $v^H = \{I_0^H, I_1^H, \ldots, I_t^H\}$. The problem can be formulated as:

$$v^H = \text{VSRNet}(v^L; \Theta);$$

where $\Theta$ represents the set of network parameters.

In the real world, the process of generating the LR video sequence from the HR video sequence can be represented by:

$$I_t^L = DBI_t^H + n_t;$$

where B denotes the blur matrix, D denotes the downsampling matrix, and n denotes noise matrix.

In most existing methods, B and D are given, so the training datasets could be artificially synthesized and the main challenge is the nature of an ill-posed inverse; but when it comes to real LR videos where B and D are unknown, performances suffer.

In general, VSR is a challenging ill-posed problem because LR frames lose high-frequency details, making recovery based only on intra-image spatial dependency ineffective. Despite that deep learning approaches have been recently employed for VSR and shown having a promising peak signal-to-noise ratio (PSNR) on some datasets, these current techniques suffer from the following shortcomings:

Insufficient training datasets for supervised learning. In supervised learning-based knowledge of HR/LR degradation methods, previous works are based on supervised learning models trained on synthesized LR/HR pairs, assuming that the training data and testing data are processed by the same degradation operations. However, in reality, the original HR version may be non-existent. Even for the case where the HR version does exist, the degradation operations for the test videos are often not known. Because of the lack of corresponding training datasets, they generally exhibit unsatisfactory results in real test videos.

Temporal inconsistency. Previous works on VSR reconstruct HR frames independently, and hence have not fully explored the correlation or continuity among HR frames and high-frequency details from previous HR frames. As a result, temporal incoherence and flickering artifacts result in the super-resolved video sequence.

Neglect of scene changes. Scene changes often occur especially in movies and television dramas. When it happens, neighboring frames have little correlation. However, previous methods fuse LR frames based on motion compensation and assume all the frames are temporally correlated, which can introduce noisy information from previous frames.

SUMMARY OF THE INVENTION

To address the aforementioned shortcomings, the present invention proposes VistGAN—a VSR approach with temporal consistency using generative adversarial networks (GAN). VistGAN is an encoder-decoder architecture based on unsupervised learning. VistGAN needs only the training HR video sequence to generate the HR/LR video frame pairs, instead of the pre-artificial-synthesized HR/LR video frame pairs, for training. By this unsupervised learning method, the encoder degrades the input HR video frames of a training HR video sequence to their LR counterparts, and the decoder seeks to recover the original HR video frames from the LR video frames. To improve the temporal consistency, different from the sliding window in conventional methods that only consider the temporal correlation in the LR domain, the unsupervised learning method provides a sliding window that explores the temporal correlation in both HR and LR domains. It keeps the temporal consistent and also fully utilizes the high-frequency details from the last-generated reconstructed HR video frame. In short, the present invention includes the following primary advantageous features:

Unsupervised learning model based on GAN for video super-resolution and temporal consistency without any prior assumption or knowledge of degradation operations. VistGAN trains an adaptive model through GAN by matching the features of its degraded LR video frames with those of the testing LR video sequence in an unsupervised manner.

Metric learning in the discriminator. VistGAN employs a metric learning method in the discriminator to map the degradation operations of the LR video frames to the feature space where matched features are separated minimally and vice versa. Further, degradation feature vectors are used in the generator module in the VistGAN architecture to make the training more stable.

In accordance to one embodiment of the present invention, the VistGAN comprises the LR Frame Generation Networks (LFGNet) configured to synthesize a LR video frame of an intermediate LR video sequence from an input HR video frame of a training HR video sequence during a training of the apparatus.

The VistGAN further comprises the HR Frame Estimation Networks (HFENet) configured to generate an output HR video frame of a reconstructed HR video sequence from a currently-processing LR video frame and a last-processed LR video frame of an input LR video sequence, and a last-generated output HR video frame of the reconstructed HR video sequence, wherein the HFENet is trained using the intermediate LR video sequence as the input LR video sequence, and the currently-processing LR video frame and the last-processed LR video frame are video frames of the intermediate LR video sequence.

The VistGAN further comprises the Kernel Estimation Networks (KENet) configured, during the training, to extract degradation features of the currently-processing LR video frame and a LR video frame of a testing LR video sequence corresponding to the currently-processing LR video frame; contract the extracted degradation features so to reduce the distance among the same degradation features and enlarge the distance among the different degradation features; feed the contracted degradation features back to the LFGNet, adding to training HR video sequence; and judge whether degradation of the intermediate LR video sequence is same as degradation of the testing LR video sequence.

BRIEF DESCRIPTION OF THE DRAWINGS

Embodiments of the invention are described in more details hereinafter with reference to the drawings, in which.

DETAILED DESCRIPTION OF THE INVENTION

In the following description, apparatuses, training methods, and GAN architectures for VSR and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

It should be apparent to practitioner skilled in the art that the foregoing examples of digital driving methods are only for the purposes of illustration of working principle of the present invention. It is not intended to be exhaustive or to limit the invention to the precise forms disclosed.

In accordance to various embodiments of the present invention, the provided VistGAN, which is an encoder-decoder architecture based on unsupervised learning, may be implemented by a combination of series of software and/or firmware machine instructions executed by one or more specially configured and interconnected computer processors. These series of software and/or firmware machine instructions may be grouped or represented by logical execution modules.

Figure 1A:
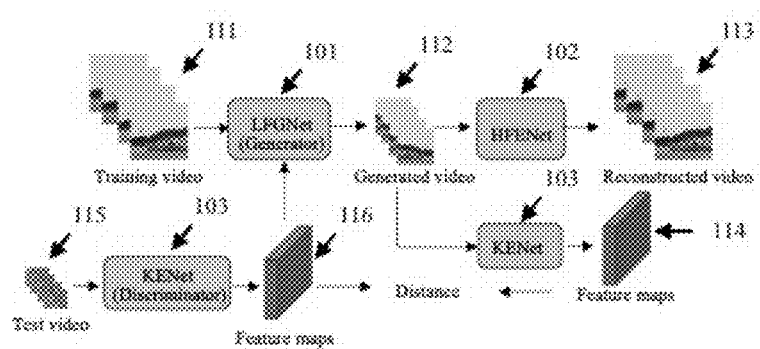
FIG. 1A shows a simplified system block and dataflow diagram of a GAN architecture for VSR under an unsupervised training according to an embodiment of the present invention.

In one embodiment, the VistGAN comprises at least the following logical execution modules: LR Frame Generation Networks (LFGNet), HR Flow Estimation Networks (HFENet), and Kernel Estimation Networks (KENet). Referring to FIG. 1A, which illustrates the dataflow of the VistGAN under a training configuration, LFGNet 101 and HFEnet 102 are cascaded together. LFGNet 101, which serves a generator and an encoder, synthesizes an intermediate LR video sequence 112 from a training HR video sequence 111, wherein the process is represented by:

$$I_t^L = DBI_t^H + n_t, \text{ and}$$

where B denotes the blur matrix, D denotes the down-sampling matrix, and n denotes noise matrix, for training HFENet 102. Instead of generating HR video frames directly, HFENet 102 serves as a decoder and estimates a HR video flow in a coarse-to-fine manner, which is later used to generate a reconstructed HR video sequence 113.

KENet 103 serves as a discriminator in the VistGAN architecture for extracting features from the intermediate LR video sequence 112 to produce an intermediate LR video feature map 114, and extracting features from a testing LR video sequence 115 to produce a testing LR video feature map 116. Then, KENet 103 operates to enlarge the feature distances between the intermediate LR video feature map 114 and the testing LR video feature map 116 for judging whether the degradation of the intermediate LR video sequence 112 is same as that of the testing LR video sequence 115, instead of only judge for true or false, and as a result produces degradation features.

LR Frame Generation Networks (LFGNet)

Deep-learning based single image super-resolution (SISR) methods show that convolutional neural network (CNN) models could learn the mapping from LR to HR images, which is a one-to-many problem. The mapping from HR to LR images, which is a many-to-one problem, could also be imitated by CNN models.

Figure 2:
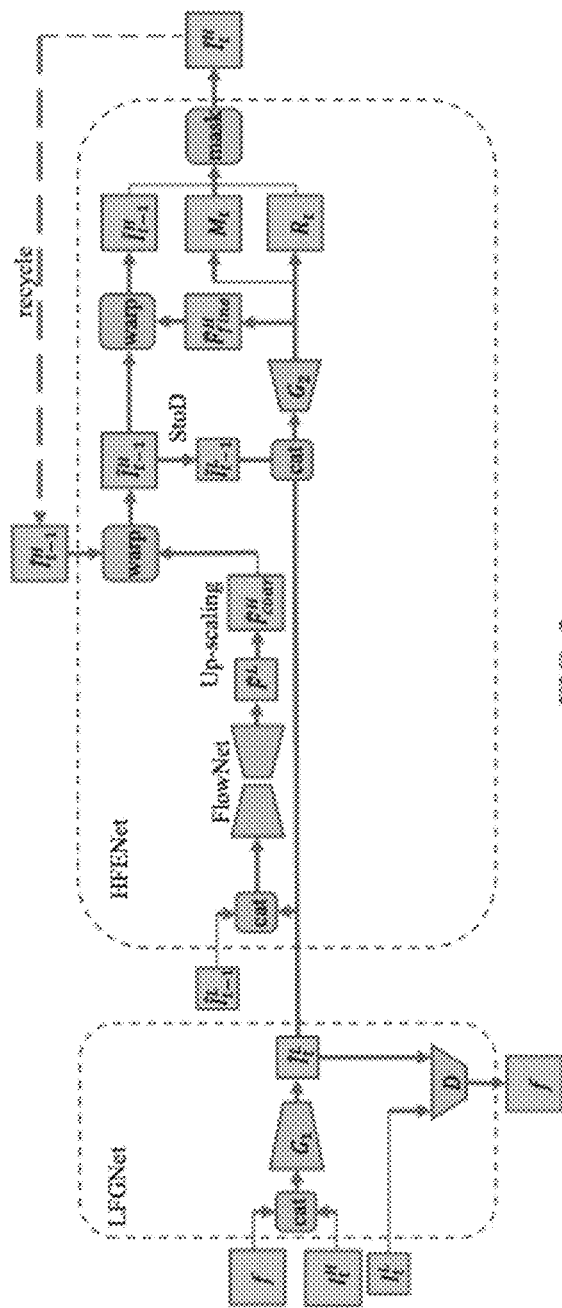
FIG. 2 shows a detailed system block and dataflow diagram of the GAN architecture.

LFGNet uses the training HR video sequence 111 as input and aims to synthesize the real LR video frames of the intermediate LR video sequence 112, which is represented by $\hat{v}^L = \{\hat{I}_0^L, \hat{I}_1^L, \ldots, \hat{I}_t^L\}$, that have the same degradation operation with those of the testing LR video sequence 115. Referring to FIG. 2 for the details of the logical architecture of VistGAN 100, with LFGNet 101 being shown on the left side. In one embodiment, LFGNet 101 comprises a video sequence synthesizer, $G_1$, which is a GAN configured to down-sample the HR video frames of the training HR video sequence 111, which is represented by $v^H = \{I_0^H, I_1^H, \ldots, I_t^H\}$ in generating the LR video frames of the intermediate LR video sequence 112. KENet 103 serves as the discriminator, denoted by D, for judging whether the degradation of the intermediate LR video sequence 112 is same as that of the testing LR video sequence 115, which is represented by $v^L = \{I_0^L, I_1^L, \ldots, I_t^L\}$. As such, the production of LR video frames of the intermediate LR video sequence 112, $\hat{I}_t^L$, can be represented by:

$$\hat{I}_t^L = G_1(I_t^H; \Theta);$$

where represents the set of network parameters of LFGNet 101. Further, the GAN loss, $\mathcal{L}_{GAN}$, can be computed by solving:

$$\mathcal{L}_{GAN} = \frac{1}{N} \sum_{t=1}^{n} \left\| D(\hat{I}_t^L) - D(I_t^L) \right\|_2;$$

where N is the number of samples.

Since the ground truth is not available, to maintain the content similarity between HR and LR video frame pairs of training HR video sequence 111 and the intermediate LR video sequence 112 respectively, a computation of content loss, which is composed of pixel loss and VGG loss, is introduced to the intermediate LR video sequence synthetization. The pixel loss is used to maintain the down-sampling property of the intermediate LR video sequence synthetization, while VGG (Visual Geometry Group) loss causes the output LR video frames produced from $G_1$ to have the same semantic content as the original input HR video frames to $G_1$. The pixel loss, $\mathcal{L}_{pix}$, and VGG loss, $\mathcal{L}_{VGG}$, are computed by:

$$\mathcal{L}_{pix} = \frac{1}{N}\sum_{i=1}^{n}\left\|I_{t\downarrow}^{H} - \hat{I}_{t}^{L}\right\|_{2}; \text{ and}$$

$$\mathcal{L}_{VGG} = \frac{1}{N}\sum_{i=1}^{n}\left\|\phi_{i,j}(I_{t\downarrow}^{H}) - \phi_{i,j}(\hat{I}_{t}^{L})\right\|_{2};$$

where $I_{t\downarrow}^{H}$ denotes the video frame down-sampled (i.e. by bicubic down-sampling) from the input HR video frame; and $\phi_{i,j}$ denotes the feature map between the j-th convolution layer and the i-th max-pooling layer in the pre-trained VGG-19 network.

Although the degradation methods of $I_{t\downarrow}^{H}$ and $\hat{I}_{t}^{L}$ are different, the minimization of pixel loss and VGG loss can protect the output LR video frames from deviating in the down-sampling operations. Although the realistic degradation is unknown, the prior information that LFGNet 101 employed is a kind of down-sampling operation. Although a bicubic down-sampling may be used in the computation of the pixel loss, $\mathcal{L}_{pix}$, its objection is not to obtain the bicubic down-sampling result, but to ensure that the intermediate LR video sequence synthetization by $G_1$ is indeed a kind of down-sampling operation. As a VGG-19 network could extract high-level information from images, although the bicubic down-sampled HR video frames, $I_{t\downarrow}^{H}$, are different from the results produced from $G_1$, they are a similar to a certain degree with differences in the low-level information, but the high-level information the same. Training the GAN may generate the irrelevant content. To mitigate, pixel loss is introduced to make the training more stable.

HR Flow Estimation Networks (HFENet)

After many HR and LR video frame pairs of training HR video sequence 111 and the intermediate LR video sequence 112 are produced by LFGNet 101, the LR video frames of the intermediate LR video sequence 112 are used to train HFENet 102 to generate the output HR video frames of the reconstructed HR video sequence 113. HFENet 102 employs an HR frame recurrent architecture to improve the temporal consistency of output sequences. Contrary to generating each HR video frame of the reconstructed HR video sequence 113 independently, the recurrent architecture of HFENet 102 utilizes the high-frequency details of the last-generated HR video frame, $\hat{I}_{t-1}^{H}$. The generation of a HR video frame, $\hat{I}_{t}^{H}$, of the reconstructed HR video sequence 113 can then be represented by:

$$\hat{I}_{t}^{H} = \text{Net}(\hat{I}_{t}^{L}, \hat{I}_{t-1}^{L}, \hat{I}_{t-1}^{H}; \Theta);$$

Although may also be obtained directly by fusing $\hat{I}_{t-1}^{H}$ and $\hat{I}_{t}^{L}$, the high-frequency details in $\hat{I}_{t-1}^{H}$, in this case, are not fully exploited. As such, HFENet 102 is configured to estimate the HR flow to warp $\hat{I}_{t-1}^{H}$, preserving its high-frequency details, boosting temporal consistency. Further, sometimes the pixel values of the same feature in different video frames of the video sequence may change, a residual frame that recovers the high-frequency details from $\hat{I}_{t}^{L}$, and an occlusion mask matrix comprises the fusion weight of the warped $\hat{I}_{t-1}^{H}$ and the residual frame to generate $\hat{I}_{t}^{H}$.

Referring to FIG. 2 still for the details of the logical architecture of VistGAN 100, with HFENet 102 being shown on the right side.

In one embodiment, HFENet 102 comprises a coarse flow estimator, which comprises a FlowNet and an up-scaler. The coarse flow estimator is configured to estimate a LR flow between the currently-processing LR video frame of the intermediate LR video sequence 112, $\hat{I}_{t}^{L}$, and the last-processed LR video frame of the intermediate LR video sequence 112, $\hat{I}_{t-1}^{L}$, by the FlowNet; then up-scale the LR flow to obtain a coarse HR flow, $\hat{F}_{coar}^{H}$, by the up-scaler. This operation can be represented by:

$$\hat{F}_{coar}^{H} = \text{Upscale}(\text{FlowNet}(\hat{I}_{t}^{L}, \hat{I}_{t-1}^{L}; \Theta)).$$

HFENet 102 further comprises a fine flow estimator, which comprises a first warper, a space-to-depth mapper, denoted by StoD, and a generator, denoted by $G_2$, for generating a fine HR flow, occlusion mask matrix, and residual frame. The generator, $G_2$, is a neural network, which can be a GAN. The fine flow estimator is configured to first warp the last-generated HR video frame of the reconstructed HR video sequence 113, $\hat{I}_{t-1}^{H}$, and the coarse HR flow, $\hat{F}_{coar}^{H}$, to produce a first warped HR video frame, $\tilde{I}_{t-1}^{H}$, by the warper; then space-to-depth map the first warped HR video frame, $\tilde{I}_{t-1}^{H}$, by StoD, into a first warped LR video frame, $\tilde{I}_{t-1}^{L}$; and lastly obtain a fine HR flow, $\hat{F}_{fine}^{H}$, an occlusion mask matrix, $M_t$, having values between 0 and 1, and a residual frame, $R_t$, by the generator, $G_2$, from the first warped LR video frame, $\tilde{I}_{t-1}^{L}$, and the currently-processing LR video frame of the intermediate LR video sequence 112, $\hat{I}_{t}^{L}$. The operation of the fine flow estimator can be represented by:

$$\hat{F}_{fine}^{H}, M_t, R_t = G_2(\text{StoD})(\text{Warp}(\hat{F}_{coar}^{H}, \hat{I}_{t-1}^{H}), \hat{I}_{t}^{L}).$$

Lastly, HFENet 102 further comprises a HR frame synthesizer, which comprises a second warper and a mask fuser. Although it is desirable to preserve details in the last-generated HR video frame of the reconstructed HR video sequence 113, $\hat{I}_{t-1}^{H}$, the currently-processing LR video frame of the intermediate LR video sequence 112, It, may have new details. Also, as scene changes do happen in videos, high-frequency details in $\hat{I}_{t-1}^{H}$ needed to be filtered in these situations. As such, a HR video frame of the reconstructed HR video sequence 113, $\hat{I}_{t}^{H}$, is synthesized by fusing details from $\hat{I}_{t-1}^{H}$ and new details from $\hat{I}_{t}^{L}$ according to the occlusion mask matrix, $M_t$. The HR frame synthesizer is configured to warp the fine HR flow, $\hat{F}_{fine}^{H}$, and the warped last-generated HR video frame of the reconstructed HR video sequence 113, $\tilde{I}_{t-1}^{H}$ (first warped HR video frame), by the second warper to produce a second warped HR video frame, and synthesize the HR video frame of the reconstructed HR video sequence 113, $\hat{I}_{t}^{H}$, by fusing the second warped HR video frame and the residual frame, $R_t$, according to the occlusion mask matrix, $M_t$, by the mask fuser. The operation of the HR frame synthesizer can be represented by:

$$\hat{I}_{t}^{H} = \text{Warp}(\hat{F}_{fine}^{H}, \hat{I}_{t-1}^{H}) \cdot M_t + R_t(1 - M_t).$$

Figure 1B:
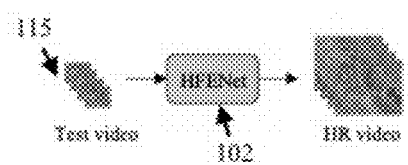
FIG. 1B shows a simplified system block and dataflow diagram of the GAN architecture for VSR under testing.

Referring to FIG. 1B, during the testing of VistGAN 100, only HFENet 102 is active. The input to HFENet 102 is active is the LR video frames of the testing LR video sequence 115 instead of the intermediate LR video sequence 112. During runtime, a real LR video sequence is input to HFENet 102 to generate a reconstructed HR video sequence.

Kernel Estimation Networks (KENet)

KENet 103 serves as the discriminator in the logical architecture of VistGAN 100. KENet 103 comprises several convolutional layers and fully-connected layers, and configured to extract the degradation features of the LR video frames of the intermediate LR video sequence 112 and the corresponding LR video frames of the testing LR video sequence 115. After obtaining the degradation features, a metric learning method is employed to contract (or cluster) the degradation features to reduce the distance among the same degradation features and enlarge the distance among the different degradation features. The contracting of the degradation features can be achieved by minimizing a contrastive loss, $\mathcal{L}_{con}$, which is expressed as:

$$\mathcal{L}_{con} = \frac{1}{2N}\sum_{n=1}^{n}\left(yd^2 + (1-y)\max(\text{margin}-d, 0)^2\right); \text{ and}$$

$$d = \|a_n - b_n\|_2;$$

where margin is the expected distance of different degradation features, a and b are two degradation feature vectors, d is the distance between a and b, and n is the number of comparisons. The same class only includes a LR video frame of the testing LR video sequence 115. To avoid having KENet 103 learning the content information of text video frames, a warped testing LR video frame is obtained by warping the last-processed LR video frame, $\hat{I}_{t-1}^L$, and the currently-processing LR video frame, $\hat{I}_{t}^L$, of the testing LR video sequence 115. The of the LR video frame of the test LR video sequence 115, the warped testing LR video frame, and the LR video frames of the intermediate LR video sequence 112 are added into the training data to make KENet 103 learn to distinguish them, and to KENet 103, these input video frames are used as different classes, they have similar contents but different degradation operations. Since it is easy for LFGNet 101 to learn other noise information, by using the metric learning method, the contracted degradation features are fed back to LFGNet 101, adding to the training HR video sequence 111, to make the training more stable.

Loss Functions

In LFGNet 101, to synthesize the real LR video frames of the intermediate LR video sequence 112, corresponding to the input HR video frames of the training HR video sequence 111, GAN loss is introduced to imitate the LR video frames of the testing LR video sequence 115 by decreasing the distance with the degradation features in the LR video frames of the intermediate LR video sequence 112 with those in the LR video frames of the testing LR video sequence 115, and a content loss is introduced to constrain the relationship of the HR/LR video frame pairs of the training HR video sequence 111 and the intermediate LR video sequence 112. The introduction of these two losses aims to make the intermediate LR video sequence 112 having the same content as in the input training HR video sequence 111 but having the same degradation operations as in the testing LR video sequence 115. In addition, a cycle loss is introduced to make adversarial training of LFGNet 101 more stable and prevents the training process deviating the down-sample and up-scale operations. The cycle loss is defined as:

$$\mathcal{L}_{cyc} = \|G_1(\hat{I}_t^H) - I_t^L\|_2;$$

where $I_t^L$ is a LR video frame of the testing LR video sequence 115; and is a HR video frame of the output reconstructed HR video sequence 116 generated by HFENet 102 from the testing LR video sequence 115.

The total loss, $\mathcal{L}_{LFG}$, in LFGNet 101 can be expressed as:

$$\mathcal{L}_{LFG} = \lambda_1 \mathcal{L}_{GAN} + \lambda_2 \mathcal{L}_{pix} + \lambda_3 \mathcal{L}_{VGG} + \lambda_4 \mathcal{L}_{cyc}.$$

During the reconstruction of HR video frames, mean square error (MSE) is frequently used to obtain high PSNR. This can be achieved by introducing a L2 loss, $\mathcal{L}_{sr}$, into HFENet 102, which is given by:

$$\mathcal{L}_{sr} = \|\hat{I}_t^H - I_t^H\|_2.$$

During the coarse flow estimation, since the flow ground truth is not available, a warp loss, $\mathcal{L}_{warp1}$, is introduced to supervise the coarse flow estimation network, and it is given by:

$$\mathcal{L}_{warp1} = \|\text{Warp}(F_{coar}, \hat{I}_{t-1}^L) - I_t^L\|_2.$$

During the fine flow estimation, it is desirable to have the estimated optical flow to approach the optical flow between input HR video frames, which is used as another learning target to enhance reconstruction quality. The warp loss, $\mathcal{L}_{warp2}$, introduced in the fine flow estimation is given by:

$$\mathcal{L}_{warp2} = \|\text{Warp}(F_{coar}+F_{fine}, I_{t-1}^H) - I_t^H\|_2.$$

MSE loss is beneficial for the high PSNR and the warp loss could help ensuring the temporal consistency, which also preserves the high-frequency details from previous HR frame and contribute to improving the PSNR. The total loss, $\mathcal{L}_{HFE}$, in HFENet 102 can then be expressed as:

$$\mathcal{L}_{HFE} = \eta_1 \mathcal{L}_{sr} + \eta_2 \mathcal{L}_{warp1} + \eta_3 \mathcal{L}_{warp2}.$$

Thus, the total loss, $\mathcal{L}_{total}$, of VistGAN 100 is:

$$\mathcal{L}_{total} = \mathcal{L}_{LFG} + \mathcal{L}_{HFE}.$$

The function of KENet 103 is to extract the degradation features and cluster the same degradation features together. The aim is to reduce the distance among the same degradation features and enlarge the distance among the different degradation features. The loss in KENet 103, $\mathcal{L}_{KENet}$, therefore, is:

$$\mathcal{L}_{KENet} = \mathcal{L}_{con}.$$

The embodiments disclosed herein may be implemented using computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An apparatus for video super-resolution (VSR) using generative adversarial networks (GAN), comprising:
a set of low-resolution (LR) frame generation networks (LFGNet) configured to synthesize a LR video frame of an intermediate LR video sequence from an input high-resolution (HR) video frame of a training HR video sequence during a training of the apparatus;
a set of high-resolution (HR) frame estimation networks (HFENet) configured to generate an output HR video frame of a reconstructed HR video sequence from a currently-processing LR video frame and a last-processed LR video frame of an input LR video sequence, and a last-generated output HR video frame of the reconstructed HR video sequence,
  wherein the HFENet is trained during the training of the apparatus using the intermediate LR video sequence as the input LR video sequence, and the currently-processing LR video frame and the last-processed LR video frame are video frames of the intermediate LR video sequence; and
a set of kernel estimation networks (KENet) configured, during the training of the apparatus, to:
  extract degradation features of the currently-processing LR video frame and a LR video frame of a testing LR video sequence corresponding to the currently-processing LR video frame;
  contract the extracted degradation features so to reduce the distance among the same degradation features and enlarge the distance among the different degradation features;
  feed the contracted degradation features back to the LFGNet, adding to the training HR video sequence; and
  judge whether degradation of the intermediate LR video sequence is same as degradation of the testing LR video sequence;
wherein the HFENet comprises:
  a coarse flow estimator configured to estimate a LR flow between the currently-processing LR video frame and the last-processed LR video frame, and up-scale the estimated LR flow to obtain a coarse HR flow;
  a fine flow estimator configured to:
    warp a last-generated output HR video frame of the reconstructed HR video sequence and the coarse HR flow to produce a first warped HR video frame;
    space-to-depth map the first warped HR video frame to produce a first warped LR video frame; and
    generate a fine HR flow, an occlusion mask matrix, and a residual frame from the first warped LR video frame and the currently-processing LR video frame; and
  a HR frame synthesizer configured to:
    warp the fine HR flow and the first warped HR video frame to produce a second warped HR video frame; and
    synthesize the output HR video frame of a reconstructed HR video sequence by fusing the second warped HR video frame and the residual frame according to the occlusion mask matrix;
wherein the occlusion mask matrix comprises one or more fusion weight for fusing the second warped HR video frame and the residual frame; and
wherein the residual frame comprises high-frequency details from the currently-processing LR video frame.

2. The apparatus of claim 1, wherein the synthesis of the output LR video frame of the intermediate LR video sequence from the input HR video frame of the training HR video sequence by the LFGNet during training comprises:

down-sampling the HR video frame of the training HR video sequence to generate a down-sampled HR video frame of the training HR video sequence; and
minimizing a content loss in the synthesis of the output LR video frame based on the down-sampled HR video frame, wherein the content loss comprises a pixel loss and a VGG (Visual Geometry Group) loss.

3. The apparatus of claim 1, wherein the KENet is further configured to execute a metric learning method in contracting the extracted degradation features;
wherein the metric learning method comprises computing and minimizing a contrastive loss of the extracted degradation features.

4. A method for training an apparatus for video super-resolution (VSR) using generative adversarial networks (GAN), comprising:
wherein the apparatus comprises:
  a set of low-resolution (LR) frame generation networks (LFGNet);
  a set of high-resolution (HR) frame estimation networks (HFENet); and
  a set of kernel estimation networks (KENet);
wherein the method comprises:
  synthesizing, by the LFGNet, a currently-processing LR video frame of an intermediate LR video sequence from an input HR video frame of a training HR video sequence;
  generating, by the HFENet, an output HR video frame of a reconstructed HR video sequence from the currently-processing LR video frame and a last-processed LR video frame of the intermediate LR video sequence, and a last-generated output HR video frame of the reconstructed HR video sequence,
  extracting, by the KENet, degradation features of the currently-processing LR video frame and a LR video frame of a testing LR video sequence corresponding to the currently-processing LR video frame;
  contracting, by the KENet, the extracted degradation features so to reduce the distance among the same degradation features and enlarge the distance among the different degradation features;
  feeding the contracted degradation features back to the LFGNet, adding to training HR video sequence; and
  judging, by the KENet, whether degradation of the intermediate LR video sequence is same as degradation of the testing LR video sequence;
wherein the HFENet comprises:
  a coarse flow estimator configured to estimate a LR flow between the currently-processing LR video frame and the last-processed LR video frame, and up-scale the estimated LR flow to obtain a coarse HR flow;
  a fine flow estimator configured to:
    warp a last-generated output HR video frame of the reconstructed HR video sequence and the coarse HR flow to produce a first warped HR video frame;
    space-to-depth map the first warped HR video frame to produce a first warped LR video frame; and
    generate a fine HR flow, an occlusion mask matrix, and a residual frame from the first warped LR video frame and the currently-processing LR video frame; and
  a HR frame synthesizer configured to:
    warp the fine HR flow and the first warped HR video frame to produce a second warped HR video frame; and synthesize the output HR video frame of a reconstructed HR video sequence by fusing the second warped HR video frame and the residual frame according to the occlusion mask matrix;

wherein the occlusion mask matrix comprises one or more fusion weight for fusing the second warped HR video frame and the residual frame; and wherein the residual frame comprises high-frequency details from the currently-processing LR video frame.

5. The method of claim 4, wherein the synthesis of currently-processing LR video frame of the intermediate LR video sequence from the input HR video frame of the training HR video sequence by the LFGNet comprises:

down-sampling the HR video frame of the training HR video sequence to generate a down-sampled HR video frame of the training HR video sequence; and minimizing a content loss in the synthesis of the currently-processing LR video frame based on the down-sampled HR video frame, wherein the content loss comprises a pixel loss and a VGG (Visual Geometry Group) loss.

6. The method of claim 4, wherein the contracting of the extracted degradation features comprises executing a metric learning method, the metric learning method comprises computing and minimizing a contrastive loss of the extracted degradation features.

7. An apparatus for video super-resolution (VSR) using generative adversarial networks (GAN), comprising:

a set of low-resolution (LR) frame generation networks (LFGNet) configured to synthesize a LR video frame of an intermediate LR video sequence from an input high-resolution (HR) video frame of a training HR video sequence during a training of the apparatus;

a set of high-resolution (HR) frame estimation networks (HFENet) configured to generate an output HR video frame of a reconstructed HR video sequence from a currently-processing LR video frame and a last-processed LR video frame of an input LR video sequence, and a last-generated output HR video frame of the reconstructed HR video sequence, wherein the HFENet comprises: a coarse flow estimator, a fine flow estimator and a HR frame synthesizer, wherein the coarse flow estimator generates a coarse HR flow according to the currently-processing LR video frame and a last-processed LR video frame, the fine flow estimator generates a fine HR flow according to the last-generated output HR video frame and the currently-processing LR video frame, and the HR frame synthesizer generates the output HR video frame according to the fine HR flow, the coarse HR flow and the last-generated output HR video frame, wherein the HFENet is trained during the training of the apparatus using the intermediate LR video sequence as the input LR video sequence, and the currently-processing LR video frame and the last-processed LR video frame are video frames of the intermediate LR video sequence; and a set of kernel estimation networks (KENet) configured, during the training of the apparatus, to:

extract degradation features of the currently-processing LR video frame and a LR video frame of a testing LR video sequence corresponding to the currently-processing LR video frame;

contract the extracted degradation features so to reduce the distance among the same degradation features and enlarge the distance among the different degradation features;

feed the contracted degradation features back to the LFGNet, adding to the training HR video sequence; and judge whether degradation of the intermediate LR video sequence is same as degradation of the testing LR video sequence.

8. The apparatus of claim 7, wherein the synthesis of the output LR video frame of the intermediate LR video sequence from the input HR video frame of the training HR video sequence by the LFGNet during training comprises:

down-sampling the HR video frame of the training HR video sequence to generate a down-sampled HR video frame of the training HR video sequence; and minimizing a content loss in the synthesis of the output LR video frame based on the down-sampled HR video frame, wherein the content loss comprises a pixel loss and a VGG (Visual Geometry Group) loss.

9. The apparatus of claim 7, wherein the HFENet comprises:

the coarse flow estimator configured to estimate a LR flow between the currently-processing LR video frame and the last-processed LR video frame, and up-scale the estimated LR flow to obtain the coarse HR flow;

the fine flow estimator configured to:

warp the last-generated output HR video frame of the reconstructed HR video sequence and the coarse HR flow to produce a first warped HR video frame;

space-to-depth map the first warped HR video frame to produce a first warped LR video frame; and generate the fine HR flow, an occlusion mask matrix, and a residual frame from the first warped LR video frame and the currently-processing LR video frame; and the HR frame synthesizer configured to:

warp the fine HR flow and the first warped HR video frame to produce a second warped HR video frame; and synthesize the output HR video frame of a reconstructed HR video sequence by fusing the second warped HR video frame and the residual frame according to the occlusion mask matrix;

wherein the occlusion mask matrix comprises one or more fusion weight for fusing the second warped HR video frame and the residual frame; and wherein the residual frame comprises high-frequency details from the currently-processing LR video frame.

10. The apparatus of claim 7, wherein the KENet is further configured to execute a metric learning method in contracting the extracted degradation features;

wherein the metric learning method comprises computing and minimizing a contrastive loss of the extracted degradation features.

* * * * *